(12) United States Patent
DiGiovanni (10) Patent No.: US 8,500,833 B2
(45) Date of Patent: Aug. 6, 2013

(54) ABRASIVE ARTICLE AND METHOD OF FORMING

(75) Inventor: Anthony A. DiGiovanni, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 232 days.

(21) Appl. No.: 12/844,666

(22) Filed: Jul. 27, 2010

(65) Prior Publication Data

US 2011/0023377 A1  Feb. 3, 2011

Related U.S. Application Data

(60) Provisional application No. 61/228,897, filed on Jul. 27, 2009.

(51) Int. Cl.
| | |
|---|---|
| *C09G 1/02* | (2006.01) |
| *C03C 3/21* | (2006.01) |
| *C04B 35/486* | (2006.01) |
| *C04B 35/48* | (2006.01) |
| *C01G 25/02* | (2006.01) |

(52) U.S. Cl.
USPC ............... 51/307; 51/293; 501/46; 501/103

(58) Field of Classification Search
USPC ....... 451/41, 533; 51/293, 307, 309; 501/103, 501/46
See application file for complete search history.

(56) References Cited

U.S. PATENT DOCUMENTS

| | | | |
|---|---|---|---|
| 2,947,609 | A | 8/1960 | Strong |
| 4,128,136 | A | 12/1978 | Generoux |
| 4,186,628 | A | 2/1980 | Bonnice |
| 4,255,165 | A | 3/1981 | Dennis et al. |
| 4,351,401 | A | 9/1982 | Fielder |
| 4,385,907 | A | 5/1983 | Tomita et al. |
| 4,471,845 | A | 9/1984 | Jurgens |
| 4,478,298 | A | 10/1984 | Hake et al. |
| 4,592,433 | A | 6/1986 | Dennis |
| 4,604,106 | A | 8/1986 | Hall et al. |
| 4,662,896 | A | 5/1987 | Dennis |
| 4,676,124 | A | 6/1987 | Fischer |
| 4,718,505 | A | 1/1988 | Fuller |
| 4,764,255 | A | 8/1988 | Fischer et al. |
| 4,797,138 | A | 1/1989 | Komanduri |
| 4,828,436 | A | 5/1989 | Briese |

(Continued)

FOREIGN PATENT DOCUMENTS

| | | |
|---|---|---|
| EP | 0546725 A1 | 6/1993 |
| EP | 0582484 A1 | 2/1994 |

(Continued)

OTHER PUBLICATIONS

Cetinkol, Mehmet et al. "Pressure dependence of negative thermal expansion in Zr2(WO4)(PO4)2." Solid State Communication. 149. (2009): 421-424.

(Continued)

*Primary Examiner* — Pegah Parvini
(74) *Attorney, Agent, or Firm* — TraskBritt (57) ABSTRACT

An abrasive article including a material including an abrasive material and a filler material having an average negative coefficient of thermal expansion (CTE) within a range of temperatures between about 70 K to about 1500 K.

20 Claims, 4 Drawing Sheets

U.S. PATENT DOCUMENTS

| | | | |
|---|---|---|---|
| 4,850,523 A | 7/1989 | Slutz | |
| 4,861,350 A | 8/1989 | Phaal et al. | |
| 4,866,885 A | 9/1989 | Dodsworth | |
| 4,919,220 A | 4/1990 | Fuller et al. | |
| 4,932,484 A | 6/1990 | Warren et al. | |
| 4,987,800 A | 1/1991 | Gasan et al. | |
| 4,991,670 A | 2/1991 | Fuller et al. | |
| 4,993,888 A | 2/1991 | Briese | |
| 4,997,049 A | 3/1991 | Tank et al. | |
| 5,025,873 A | 6/1991 | Cerkovnik | |
| 5,028,177 A | 7/1991 | Meskin et al. | |
| 5,030,276 A | 7/1991 | Sung et al. | |
| 5,037,452 A * | 8/1991 | Gary et al. | 51/293 |
| 5,049,164 A | 9/1991 | Horton et al. | |
| 5,057,124 A | 10/1991 | Cerceau | |
| 5,116,568 A | 5/1992 | Sung et al. | |
| 5,119,714 A | 6/1992 | Scott et al. | |
| 5,147,001 A | 9/1992 | Chow et al. | |
| 5,154,245 A | 10/1992 | Waldenstrom et al. | |
| 5,159,857 A | 11/1992 | Jurewicz | |
| 5,173,090 A | 12/1992 | Scott et al. | |
| 5,199,832 A | 4/1993 | Meskin et al. | |
| 5,217,081 A | 6/1993 | Waldenstrom et al. | |
| 5,232,320 A | 8/1993 | Tank et al. | |
| 5,238,074 A | 8/1993 | Tibbitts et al. | |
| 5,248,317 A | 9/1993 | Tank et al. | |
| 5,264,283 A | 11/1993 | Waldenstrom et al. | |
| 5,273,125 A | 12/1993 | Jurewicz | |
| 5,282,513 A | 2/1994 | Jones | |
| 5,299,471 A | 4/1994 | Tank et al. | |
| 5,370,717 A | 12/1994 | Lloyd et al. | |
| 5,421,423 A | 6/1995 | Huffstutler | |
| 5,431,239 A | 7/1995 | Tibbitts et al. | |
| 5,433,778 A | 7/1995 | Sleight | |
| 5,435,403 A | 7/1995 | Tibbitts | |
| 5,437,343 A | 8/1995 | Cooley et al. | |
| 5,499,688 A | 3/1996 | Dennis | |
| 5,514,360 A | 5/1996 | Sleight et al. | |
| 5,535,838 A | 7/1996 | Kashavan et al. | |
| 5,549,171 A | 8/1996 | Mensa-Wilmot et al. | |
| 5,551,522 A | 9/1996 | Keith et al. | |
| 5,582,261 A | 12/1996 | Keith et al. | |
| 5,651,421 A | 7/1997 | Newton et al. | |
| 5,667,028 A | 9/1997 | Truax et al. | |
| 5,706,906 A | 1/1998 | Jurewicz et al. | |
| 5,720,357 A | 2/1998 | Fuller et al. | |
| 5,722,497 A | 3/1998 | Gum et al. | |
| 5,738,696 A * | 4/1998 | Wu | 51/296 |
| 5,740,874 A | 4/1998 | Matthias | |
| 5,755,299 A | 5/1998 | Langforn, Jr. et al. | |
| 5,776,550 A | 7/1998 | Disam et al. | |
| 5,816,346 A | 10/1998 | Beaton | |
| 5,871,060 A | 2/1999 | Jensen et al. | |
| 5,881,830 A | 3/1999 | Cooley | |
| 5,904,213 A | 5/1999 | Caraway et al. | |
| 5,906,245 A | 5/1999 | Tibbitts et al. | |
| 5,919,720 A | 7/1999 | Sleight et al. | |
| 5,924,501 A | 7/1999 | Tibbitts | |
| 5,947,609 A | 9/1999 | Lee | |
| 5,960,896 A | 10/1999 | Barr et al. | |
| 5,967,249 A | 10/1999 | Butcher | |
| 5,975,811 A | 11/1999 | Briese | |
| 5,979,571 A | 11/1999 | Scott et al. | |
| 5,979,578 A | 11/1999 | Packer | |
| 5,979,579 A | 11/1999 | Jurewicz | |
| 6,000,483 A | 12/1999 | Jurewicz et al. | |
| 6,003,623 A | 12/1999 | Miess | |
| 6,009,962 A | 1/2000 | Beaton | |
| 6,068,071 A | 5/2000 | Jurewicz | |
| 6,082,223 A | 7/2000 | Tibbitts | |
| 6,098,729 A | 8/2000 | Matthias | |
| 6,102,140 A | 8/2000 | Boyce et al. | |
| 6,123,161 A | 9/2000 | Taylor | |
| 6,132,676 A | 10/2000 | Holzer et al. | |
| 6,145,607 A | 11/2000 | Griffin et al. | |
| 6,148,938 A | 11/2000 | Beaton | |
| 6,164,394 A | 12/2000 | Mensa-Wilmot et al. | |
| 6,183,716 B1 | 2/2001 | Sleight et al. | |
| 6,187,068 B1 | 2/2001 | Frushour et al. | |
| 6,187,700 B1 | 2/2001 | Merkel | |
| 6,189,634 B1 | 2/2001 | Bertagnolli et al. | |
| 6,193,001 B1 | 2/2001 | Eyre et al. | |
| 6,202,770 B1 | 3/2001 | Jurewicz et al. | |
| 6,202,771 B1 | 3/2001 | Scott et al. | |
| 6,216,805 B1 | 4/2001 | Lays et al. | |
| 6,218,324 B1 | 4/2001 | Goettler | |
| 6,220,375 B1 | 4/2001 | Butcher et al. | |
| 6,230,828 B1 | 5/2001 | Beuershausen et al. | |
| 6,258,743 B1 | 7/2001 | Fleming et al. | |
| 6,283,233 B1 | 9/2001 | Lamine et al. | |
| 6,315,066 B1 | 11/2001 | Dennis | |
| 6,326,685 B1 | 12/2001 | Jin et al. | |
| 6,401,844 B1 | 6/2002 | Doster et al. | |
| 6,401,845 B1 | 6/2002 | Fielder | |
| 6,403,511 B2 | 6/2002 | Fleming et al. | |
| 6,412,580 B1 | 7/2002 | Chaves | |
| 6,439,327 B1 | 8/2002 | Griffin et al. | |
| 6,446,740 B2 | 9/2002 | Eyre et al. | |
| 6,447,852 B1 * | 9/2002 | Gordeev et al. | 427/577 |
| 6,481,511 B2 | 11/2002 | Matthias et al. | |
| 6,510,906 B1 | 1/2003 | Richert et al. | |
| 6,521,174 B1 | 2/2003 | Butcher et al. | |
| 6,612,383 B2 | 9/2003 | Desai et al. | |
| 6,672,406 B2 | 1/2004 | Beuershausen | |
| 6,702,650 B2 * | 3/2004 | Adefris | 451/41 |
| 6,739,417 B2 | 5/2004 | Smith et al. | |
| 6,742,611 B1 | 6/2004 | Illerhaus et al. | |
| 6,823,952 B1 | 11/2004 | Mensa-Wilmot et al. | |
| 6,872,356 B2 | 3/2005 | Butcher et al. | |
| 6,935,444 B2 | 8/2005 | Lund et al. | |
| 7,070,011 B2 | 7/2006 | Sherwood, Jr. et al. | |
| 7,105,235 B2 | 9/2006 | Lo et al. | |
| 7,159,487 B2 | 1/2007 | Mensa-Wilmot et al. | |
| 7,188,692 B2 | 3/2007 | Lund et al. | |
| 7,237,628 B2 | 7/2007 | Desai et al. | |
| 7,350,601 B2 | 4/2008 | Belnap et al. | |
| 7,363,992 B2 | 4/2008 | Stowe et al. | |
| 7,377,341 B2 | 5/2008 | Middlemiss | |
| 7,395,882 B2 | 7/2008 | Oldham et al. | |
| 7,462,003 B2 | 12/2008 | Middlemiss | |
| 7,473,287 B2 | 1/2009 | Belnap et al. | |
| 7,493,973 B2 | 2/2009 | Kashavan et al. | |
| 7,594,553 B2 | 9/2009 | Tank et al. | |
| 7,624,818 B2 | 12/2009 | McClain et al. | |
| 7,757,793 B2 | 7/2010 | Voronin et al. | |
| 8,074,748 B1 | 12/2011 | Miess et al. | |
| 8,312,943 B1 | 11/2012 | Miess et al. | |
| 2001/0031692 A1 * | 10/2001 | Fleming et al. | 501/103 |
| 2003/0084894 A1 | 5/2003 | Sung | |
| 2003/0218268 A1 | 11/2003 | Morito et al. | |
| 2004/0007394 A1 | 1/2004 | Griffin | |
| 2005/0077091 A1 | 4/2005 | Butland et al. | |
| 2005/0100743 A1 | 5/2005 | Hougham et al. | |
| 2005/0101133 A1 | 5/2005 | Tzeng et al. | |
| 2005/0263328 A1 | 12/2005 | Middlemiss | |
| 2006/0032677 A1 | 2/2006 | Azar et al. | |
| 2006/0060390 A1 | 3/2006 | Eyre | |
| 2006/0070771 A1 | 4/2006 | McClain et al. | |
| 2006/0099895 A1 | 5/2006 | Tank et al. | |
| 2006/0144621 A1 | 7/2006 | Tank et al. | |
| 2006/0162969 A1 | 7/2006 | Belnap et al. | |
| 2006/0191723 A1 | 8/2006 | Kashavan | |
| 2006/0207802 A1 | 9/2006 | Zhang et al. | |
| 2006/0219439 A1 | 10/2006 | Shen et al. | |
| 2006/0254830 A1 | 11/2006 | Radtke | |
| 2006/0266558 A1 | 11/2006 | Middlemiss et al. | |
| 2006/0266559 A1 | 11/2006 | Kashavan et al. | |
| 2007/0029114 A1 | 2/2007 | Middlemiss | |
| 2007/0079995 A1 | 4/2007 | McClain et al. | |
| 2007/0135550 A1 | 6/2007 | Chakrapani et al. | |
| 2007/0187155 A1 | 8/2007 | Middlemiss | |
| 2007/0235230 A1 | 10/2007 | Cuillier et al. | |
| 2007/0261890 A1 | 11/2007 | Cisneros | |
| 2007/0267227 A1 | 11/2007 | Mensa-Wilmot | |
| 2007/0278014 A1 | 12/2007 | Cariveau | |
| 2007/0278017 A1 | 12/2007 | Shen et al. | |
| 2007/0284152 A1 | 12/2007 | Eyre et al. | |

| | | |
|---|---|---|
| 2008/0023231 A1 | 1/2008 | Vail |
| 2008/0047484 A1 | 2/2008 | Sung |
| 2008/0105466 A1 | 5/2008 | Hoffmaster et al. |
| 2008/0142267 A1 | 6/2008 | Griffin et al. |
| 2008/0164071 A1 | 7/2008 | Patel et al. |
| 2008/0179108 A1 | 7/2008 | McClain et al. |
| 2008/0179109 A1 | 7/2008 | Belnap et al. |
| 2008/0206576 A1 | 8/2008 | Qian et al. |
| 2008/0223621 A1 | 9/2008 | Middlemiss et al. |
| 2008/0236899 A1 | 10/2008 | Oxford et al. |
| 2008/0236900 A1 | 10/2008 | Cooley et al. |
| 2008/0264696 A1 | 10/2008 | Dourfaye et al. |
| 2008/0302575 A1 | 12/2008 | Durairajan et al. |
| 2008/0308276 A1 | 12/2008 | Scott |
| 2009/0030658 A1 | 1/2009 | Durairajan et al. |
| 2009/0032169 A1 | 2/2009 | Dourfaye et al. |
| 2009/0032571 A1 | 2/2009 | Smith |
| 2009/0120008 A1 | 5/2009 | Lockwood et al. |
| 2009/0173014 A1 | 7/2009 | Voronin et al. |
| 2009/0173548 A1 | 7/2009 | Voronin et al. |
| 2009/0218416 A1 | 9/2009 | Ohashi et al. |
| 2010/0084197 A1 | 4/2010 | Voronin et al. |
| 2010/0104874 A1 | 4/2010 | Yong et al. |
| 2010/0288564 A1 | 11/2010 | Dovalina, Jr. et al. |
| 2010/0300767 A1 | 12/2010 | Cariveau et al. |
| 2010/0326740 A1 | 12/2010 | Hall et al. |
| 2010/0326742 A1 | 12/2010 | Vempati et al. |
| 2011/0024200 A1 | 2/2011 | DiGiovanni et al. |
| 2011/0031031 A1 | 2/2011 | Vempati et al. |
| 2011/0073379 A1 | 3/2011 | DiGiovanni et al. |

FOREIGN PATENT DOCUMENTS

| | | | |
|---|---|---|---|
| EP | 0501447 | B1 | 11/2000 |
| EP | 0733776 | B1 | 9/2003 |
| EP | 1052367 | B1 | 4/2005 |
| JP | 11-165261 | A | 6/1999 |
| KR | 10-0853060 | B1 | 8/2008 |
| WO | 9929465 | A1 | 6/1999 |
| WO | 02/11876 | A2 | 2/2002 |
| WO | 2007089590 | A2 | 8/2007 |
| WO | 2007148060 | A1 | 12/2007 |
| WO | WO 2008/074010 | * | 6/2008 |
| WO | 2010097784 | A1 | 9/2010 |

OTHER PUBLICATIONS

Catafesta, Jadna. "Tunable Linear Thermal Expansion Coefficient of Amorphous Zirconium Tungstate." Journal of The American Cermamic Society. 89.7 (2006): 2341-2344.

Grzechnik, Andrzej et al. "Structural transformations in cubic ZrMo2O8 at high pressures and high temperatures." Solid State Sciences. 4. (2002): 1137-1141, Apr.

Chen, B et al. "High-pressure optical study of HfW2O8." Journal of Physics:Candensed Matter. 14. (2002): 13911-13916.

Ravindran, T.R. et al. "High Pressure Behavior of ZrW2O8: Gruneisen Parameter and Thermal Properties." American Physical Society: Physical Review Letters. 84.17 (2000): 3879-3882, Jul.

Ravindran, T.R. et al. "Erratum: High Pressure Behavior of ZrW2O8: Gruneisen Parameter and Thermal Properties." American Physical Society: Physical Review Letters. 85.1 (2000): 225.

Sleight, Arthur W. "Negative thermal expansion material." Current Opinion in Solid State & Materials Science. 3. (1998): 128-131.

Bertagnolli, K. E., and Vale, R., 2000, "Understanding and Controlling Residual Stresses in Thick Polycrystalline Diamond Cutters for Enhanced Durability," Proceedings, INTERTECH 2000: An International Technical Conference on Diamond,Cubic Boron Nitride and their Applications, Vancouver, BC, Jul. 17-21, 2000.

David, W.I.F., Evans, J.S.O., and Sleight, A.W., "Zirconium Tungstate: The Incredible Shrinking Material," 1997 ISIS Laboratory Scientific Highlights.

Clegg, J. "Faster and Longer Bit Runs With New-Generation PDC Cutter." Journal of Petroleum Technology. 58.12 (2006): 73-75, Dec.

Karasawa, Hirokazu, "Laboratory Testing to Design PDC Bits for Geothermal Well Drilling." National Institute for Resources and Environment . 40. (1992): 135-141.

Scott, Dan; "The History and Impact of Synthetic Diamond Cutters and Diamond Enhanced Inserts on the Oil and Gas Industry"; Industrial Diamond Review 1/06 (11 pages).

"US Synthetic Basics of PCD Manufacturing Training Course", Orem, Utah; Oct. 2003 (34 pages).

R.L. Mehan et al., "Thermal Degradation of Sintered Diamond Compacts," Materials Research Laboratory, Report No. 88CRD041, Manuscript received Feb. 8, 1988, 20 pages.

Fran Cverna (Technical Editor), "Thermal Properties of Metals: Chapter 2—Thermal Expansion," ASM International, <http://www.asminternational.org>, ASM Ready Reference: Thermal Properties of Metals, Product Code: 06702G, 2002, 9 pages.

The International Search Report and the Written Opinion for International Application No. PCT/US2010/043416 received from the International Searching Authority (ISA/KR) dated Mar. 2, 2011, 9 pages.

The International Search Report and the Written Opinion for International Application No. PCT/US2010/033517 received from the International Searching Authority (ISA/KR) dated Jan. 10, 2011, 8 pages.

The International Search Report and the Written Opinion for International Application No. PCT/US2010/041413 received from the International Searching Authority (ISA/KR) dated Feb. 21, 2011, 12 pages.

The International Search Report and the Written Opinion for International Application No. PCT/US2010/039794 received from the International Searching Authority (ISA/KR) dated Feb. 8, 2011, 6 pages.

The International Search Report and the Written Opinion for International Application No. PCT/US2010/041411 received from the International Searching Authority (ISA/KR) dated Feb. 21, 2011, 9 pages.

The International Search Report and the Written Opinion for International Application No. PCT/US2010/050252 received from the International Searching Authority (ISA/KR) dated Apr. 27, 2011, 13 pages.

* cited by examiner

ABRASIVE ARTICLE AND METHOD OF FORMING

CROSS-REFERENCE TO RELATED APPLICATION(S)

The present application claims priority to U.S. Provisional Patent Application No. 61/228,897, filed Jul. 27, 2009, titled "Abrasive Article and Method of Forming," which application is incorporated by reference herein in its entirety.

BACKGROUND

1. Field of the Disclosure

The following is directed to abrasive articles, and, more particularly, to abrasive articles of a polycrystalline material comprising an abrasive material and a filler material.

2. Description of the Related Art

Abrasive articles are used in various industries for many different applications including, for example, forming, shaping, abrading, cutting, drilling, and finishing. Abrasive articles can also be formed of various shapes and sizes depending upon the intended end use of the abrasive article. Such articles rely upon the delivery of hard materials to a surface being worked to achieve the end result. Delivery of the hard materials can change depending upon the industry, but after sufficient use, abrasive articles can become less effective as they tend to wear during use.

Certain abrasives and abrasive materials and the methods of forming such materials have gained interest, because such materials are particularly hard and capable of withstanding a greater degree of degradation. Accordingly, the industry continues to demand improvements in abrasive articles.

SUMMARY

According to a first aspect, an abrasive article includes a material including an abrasive material and a filler material having an average negative coefficient of thermal expansion (CTE) within a range of temperatures between about 70 K to about 1500 K.

In another aspect, an abrasive article includes an abrasive material having polycrystalline diamond and a catalyst material, wherein the abrasive material comprises an average coefficient of thermal expansion (CTE) of not greater than about $2.2 \times 10^{-6}$/K within a range of temperatures between about 70 K to about 1500 K.

In still another aspect, an abrasive article includes a polycrystalline material having abrasive grains separated by grain boundaries, wherein the grain boundaries include a filler material having an average negative coefficient of thermal expansion (CTE) within a range of temperatures between about 70 K to about 1500 K.

According to yet another aspect, an abrasive article includes a polycrystalline material having abrasive grains, a catalyst material, and a material selected from the group of materials consisting of tungstate, molybdate, vanadate, and a combination thereof.

Another aspect is directed to an abrasive article including a polycrystalline material comprising abrasive grains separated by grain boundaries, wherein the grain boundaries comprise a filler material selected from the group of oxides consisting of $AMO_3$, $AM_2O_8$, $AM_2O_7$, $A_2M_3O_{12}$, and a combination thereof, wherein A represents a metal element, M represents a metal element, and O represents oxygen.

In one aspect of the present application, an abrasive article includes a substrate having an upper surface, an abrasive layer overlying the upper surface of the substrate, wherein the abrasive layer includes abrasive grains and an abrasive filler material having an average coefficient of thermal expansion (CTE) of not greater than zero within a range of temperatures between about 70 K to about 1500 K.

According to another aspect a method of forming an abrasive article includes preparing an abrasive material, preparing a filler material, and forming a polycrystalline material having grains of the abrasive material and a filler material having an average negative coefficient of thermal expansion (CTE) within a range of temperatures between about 70 K to about 1500 K.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

The following is generally directed to polycrystalline materials for use in abrasive articles and methods of forming such materials. The polycrystalline materials herein can incorporate abrasive materials that may be suitable for applications directed to material removal including, for example, grinding, cutting, polishing, and the like. In accordance with certain embodiments, the articles herein may be particularly suited for use in drill bits, such as those used in penetrating rock formations within the earth for geothermal, gas, and oil businesses. One example of such a drill bit can include polycrystalline diamond cutter (PDC) drill bits. Still, other applications may be contemplated for the polycrystalline materials herein, including thermal management devices (e.g., heat sinks), insulators, coatings, and the like. In particular reference to thermal management devices, the material may include a material having a particularly suitable thermal transfer coefficient, which can include certain inorganic polycrystalline materials (e.g., diamond) bonded to some amount of a ceramic (e.g., oxide, carbide, nitride, boride, etc.) bonded to the polycrystalline material.

Figure 1:
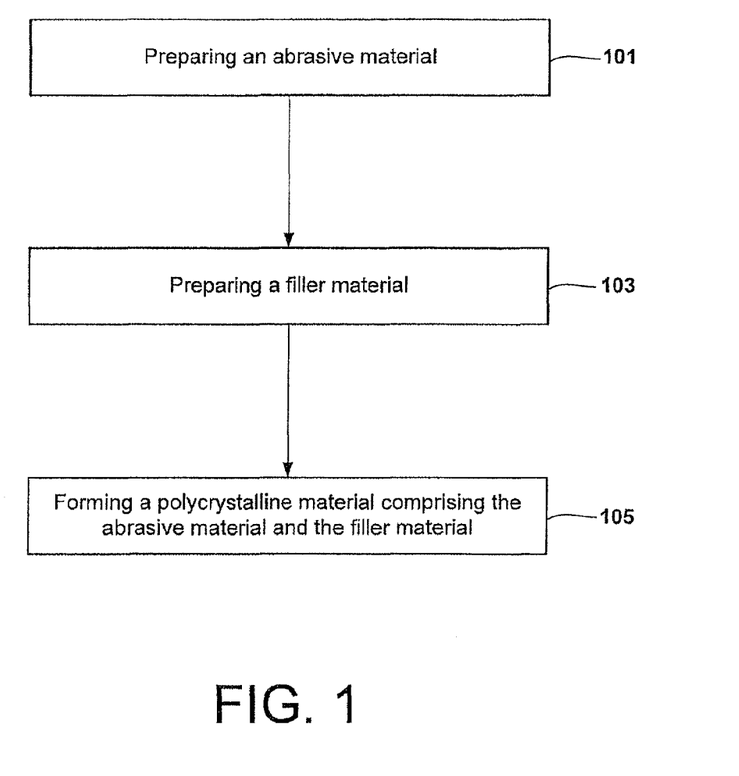
FIG. 1 includes a flowchart of a process for forming an abrasive article in accordance with an embodiment.

Referring to FIG. 1, a flowchart is provided illustrating a method of forming an abrasive article in accordance with an embodiment. As illustrated, the process is initiated at step 101 by preparing an abrasive material. Preparation of an abrasive material can include selection of an abrasive material. Selection can include choosing an abrasive material based on grade, quality, grain size, and/or distribution of grain sizes.

In particular, the abrasive material may utilize grain sizes that are submicron, nano-size, or a mixture thereof. For example, certain suitable grains sizes can be not greater than about 200 microns, such as not greater than about 150 microns, not greater than about 100 microns, not greater than about 75 microns, not greater than about 50 microns, or even not greater than about 25 microns. Nano-size particles may be particularly small, generally having an average grain size of not greater than about 500 nm, such as not greater than about 250 nm, not greater than about 100 nm, not greater than about 50 nm, or even not greater than about 1 nm.

Reference herein to abrasive materials can include those materials having a Vickers hardness of at least 25 GPa. In other embodiments, these abrasive materials can have a Vickers hardness of at least 30 GPa, such as at least 40 GPa, at least 50 GPa, or even at least about 75 GPa. Still, abrasive materials herein can have a Vickers hardness within a range between about 25 GPa and about 100 GPa, such as between about 30 GPa and about 100 GPa, or even between about 40 GPa and about 90 GPa.

The abrasive materials of embodiments here are generally inorganic materials. Some examples of abrasive materials include natural or synthetic materials, such as ceramics, cermets, and the like. Certain abrasive materials can include abrasive materials, superabrasive materials, or a combination thereof. Some suitable examples of such materials can include diamond, diamond-like-carbon, nitrides, carbides, borides, silicates, and a combination thereof. Carbides may include carbon combined with a metal element, such that useful carbides include materials such as titanium carbide, titanium boron carbide, tantalum carbide, niobium carbide, and a combination thereof. Suitable nitrides may include certain metal elements bonded to nitrogen including, for example, aluminum nitride. Silicates can include oxygen and silicon elements bonded together, such as silica, or more particularly may be formed with an additional metal element.

According to one particular embodiment, the abrasive article is formed such that the abrasive material consists essentially of diamond, such as polycrystalline diamond. In other abrasive articles, the abrasive material can consist essentially of cubic boron nitride.

After preparing the abrasive material at step 101, the process can continue at step 103 by preparing a filler material. Preparation of a filler material can include the same steps as preparing an abrasive material, that is, selecting the proper grade, quality, grain size, and/or particle size distribution of filler material. In accordance with certain embodiments, the filler material can be made of small particles having average particle sizes that are submicron (agglomerates or single, grain particles), nano-size, or a mixture thereof.

Certain embodiments may utilize a filler material having an average particle size that is less than the average particle size of the abrasive material. For example, the average particle size of the filler material can be not greater than about 100 microns, such as not greater than about 1 micron, not greater 0.5 microns, not greater than about 0.1 microns, or even not greater than about 0.05 microns.

Preparation of the filler material can include various processes or a combination of processes depending upon the process selected for forming the final-formed article. In certain processes, the filler material of the final-formed abrasive article is incorporated initially in the forming process as part of the preparation of the filler material.

Other forming processes may optionally utilize a precursor filler material. A precursor filler material may have a different form than the filler material present in the final-formed abrasive article. Examples of different forms include differences in chemical composition, physical characteristic, or combinations thereof. That is, in certain processes, the filler product may differ chemically such that the precursor filler material has a different chemical composition than the intended final-formed filler material. For example, the precursor filler material can include a reactant species that is one component of the filler material. Other processes may utilize a precursor filler material having a physically different form than that of the filler material of the final-formed abrasive article. For example, the precursor filler material may be a particle of a different size, shape, design, or combinations thereof as compared to the filler material of the final-formed abrasive article. It will be appreciated that reference to the filler material of the final-formed abrasive article is reference to a material having particular mechanical characteristics, chemical composition, lattice structure, and a combination thereof.

According to one embodiment, the precursor filler material can include a powder material. The powder material can be formed of a single material or a combination of materials. In more particular instances, the precursor filler material can include composite particles. Composite particles can include the precursor filler material combined with other materials, which may be suitable for forming the final-formed abrasive article. Certain materials that may be included in the composite particles can include passivation agents, binders materials, alloys, or pure metals that have a non-catalytic activity, a partial or limited catalytic activity, or a fully catalytic activity during a forming process. Materials having a fully catalytic or partially catalytic activity can include metals, such as Group VII through Group XI metal elements including, for example, cobalt, iron, and/or nickel.

Figure 2A:
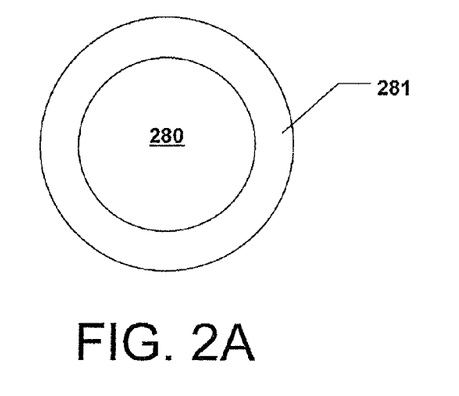
FIGS. 2A and 2B include illustrations of composite precursor filler material particles in accordance with an embodiment.

Certain embodiments can incorporate a composite particle including a core material and a coating layer overlying the core material. One type of such particle is illustrated in FIG. 2A including a core material 280 and a coating layer 281 overlying the core material 280. In utilizing such composite particles, the core material 280 can include the filler material of the final-formed abrasive article, a precursor filler material, or a combination thereof. According to one particular embodiment, the core material 280 consists essentially of the filler material. In still other embodiments, the core material 280 consists essentially of a precursor filler material.

In accordance with those embodiments utilizing a precursor filler material having a core/coating layer design, the coating layer 281 can include an inorganic material, an organic material, or a combination thereof. Suitable inorganic materials can include metals, metal alloys, ceramics, cermets, essentially pure elemental compositions (e.g., diamond) and a combination thereof. In certain instances, the coating layer 281 can be made of a metal or metal alloy material, particularly metal and/or metal alloy materials containing refractory metal materials.

Some suitable organic materials can include natural and/or synthetic materials, such as polymers, resins, epoxies, and a combination thereof. It will be appreciated, that depending upon the forming process chosen, certain organic materials may not be present in the final-formed abrasive article, such that the organic material may serve a purpose in the material and be evolved as a gas or otherwise removed during the forming process.

The coating layer 281 can be formed of a crystalline material, a polycrystalline material, an amorphous material, or a combination thereof.

In certain designs, the coating layer 281 can include a passivation agent that is a non-catalytic material that does not react with other materials of the abrasive article during the forming process. That is, a passivation agent may not necessarily undergo a chemical change or physical change during the forming process and thereby can mitigate the interaction of the core material 280 with other chemicals during the forming process such that the core material 280 may retain its chemical composition and/or mechanical properties. The passivation agent can have those characteristics described above with regard to the coating layer 281 (e.g., a polycrystalline material).

The coating layer 281 can be formed such that a majority of the content, by volume, comprises a passivation agent. In other instances, a greater amount of the coating layer 281 comprises the passivation agent, such as at least about 75 vol %, at least about 90 vol %, or even at least about 95 vol %. One particular embodiment utilizes a coating layer 281 consisting essentially of the passivation agent.

Suitable passivation agents can include certain materials described herein. For example, the passivation agent can be an inorganic material, such as a metal, metal alloy, ceramic, cermet, essentially pure elemental composition, and a combination thereof. Some suitable passivation agents can include metal elements from Group III, Group IV, Group V, and Group VI of the Periodic Table of elements. For example, some particular types of metals and metal alloys can include manganese, vanadium, titanium, scandium, zirconia, palladium, molybdenum, tantalum, tungsten, hafnium, platinum, lanthanum, neodymium, niobium, and a combination thereof. Particular examples of metal alloys can include tungsten-based alloys, molybdenum-based alloys, iron-based alloys, and a combination thereof.

In further reference to other passivation agents, some processes can utilize materials such as oxides, carbides, nitrides, borides, diamond, diamond-like carbon, cubic boron nitride, and a combination thereof. In particular instances the coating layer can be formed such that it consists essentially of diamond.

Various processes may be used to form a precursor filler material, and particularly precursor filler materials having a core/coating layer design. For example, the coating layer can be formed on the core material through processes such as deposition, spraying, precipitation, plating, mixing, adsorption, absorption, and a combination thereof. In one particular embodiment, such particles can be made through liquid-based processes including, for example, a sol-gel process, a chemical co-precipitation process, and the like. Such processes can include the formation of a mixture utilizing a liquid vehicle and particles suspended within the liquid vehicle. The particles suspended within the liquid vehicle can include the core material, the coating material, precursors or chemical reactants of the core material and/or the coating material. Moreover, in any of the foregoing processes, utilization of a precursor filler material can include utilization of a material having a stoichiometric, or alternatively, a non-stoichiometric composition.

Formation of a precursor filler material may also include a heating process, that may be used in combination with or separate from other processes, such as liquid-based processing routine. Heating processes may be particularly suitable for forming precursor filler materials having a core/coating layer design. A heating process can include application of elevated temperatures, generally well above room temperature, such as on the order of at least about 200° C., at least about 300° C., or even at least about 400° C., to which effect can incorporate a heating process that may facilitate the formation of suitable precursor filler material. Notably, heating processes may utilize particular temperatures, durations, and atmospheres to facilitate the formation of precursor filler materials.

Drying processes may also be used to facilitate the formation of precursor filler materials. In one exemplary process, spray drying can be utilized to form particles of precursor filler material having a controllable shape, such as a spherical shape, hollow sphere, or agglomerate.

Figure 2B:
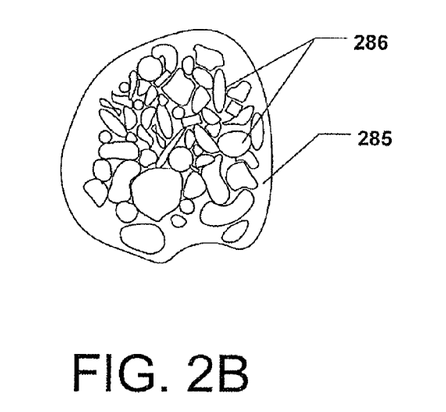

FIG. 2B includes an illustration of a composite particle according to an alternative embodiment. As illustrated, the composite particle can be an agglomerated material, including a plurality of smaller particles 286 comprising the core material, and a coating layer 285 overlying each of the smaller particles 286. It will be appreciated that while the smaller particles 286 are illustrated as relatively dispersed throughout the coating layer 285, in other embodiments, the composite particle can include agglomerates of the smaller particles 286.

After preparing a filler material at step 103, the process can continue at step 105 by forming a polycrystalline material comprising grains of the abrasive material and a filler material. The forming step can include a pre-forming step, which may be undertaken to give the materials sufficient shape and strength for handling, otherwise referred to as a "green article." The pre-forming step to produce a green product can include processes such as pressing, casting, molding, and the like or a combination thereof. In one particular process, the preforming process can include an isostatic forming process to produce a green article prior to other forming processes. Uniaxial die pressing or isostatic pressing can be carried out at a pressure of at least about 50 MPa, such as at least about 100 MPa, at least about 250 MPa, or even at least about 500 MPa.

In accordance with one embodiment, after carrying out any pre-forming processes, the process of forming the polycrystalline material can further include heating the abrasive material to a forming temperature. The forming temperatures can vary depending upon the nature of the abrasive material, and in certain instances, for example, can be at least about 1000° C. In other processes, the forming temperature can be at least about 1200° C., such as at least about 1400° C., at least about 1600° C., or even at least about 1800° C. Particular embodiments may utilize a forming temperature between about 1000° C. and about 2200° C., such as between about 1200° C. and about 2000° C., or even between about 1400° C. and about 1800° C.

Forming of the polycrystalline material can also include the application of increased pressure (i.e., a forming pressure) from standard atmospheric conditions alone or in combination with other process parameters, such as the application of a forming temperature. Notably, in those instances utilizing a combination of high temperature and high pressure, the process may be considered a high temperature, high pressure (HTHP) process. The forming pressure can be at least about 1 GPa to preform the materials, which may be contained in a vessel to facilitate the application of the elevated pressures. Certain other forming pressures may be applied to the preform material to affect forming of the abrasive article having the polycrystalline material, such pressures can be at least about 2 GPa, at least about 3 GPa, or even at least about 4 GPa. According to one embodiment, the forming pressure is within a range between about 1 GPa and about 15 GPa, between about 2 GPa and about 10 GPa between about 3 GPa and about 8 GPa. It will be appreciated that utilization of certain nano-size particles within the article may alter the forming process, such that in some instances, higher pressures and shorter durations may be used. After maintaining the forming temperature and/or forming pressure for a sufficient time, the article may be cooled. During the cooling process, the article may undergo an annealing process. The annealing can be completed at a temperature less than the forming temperature. For example, the annealing temperature can be at least about 400° C., such as at least about 500° C., such as at least about 600° C., and particularly within a range between about 400° C. and about 700° C.

The annealing process may be carried out for an annealing duration of at least about 30 minutes. In other embodiments, the annealing duration can be longer, such as on the order of at least about 60 minutes, at least about 4 hours, at least about 8 hours, or even at least about 10 hours. Still, certain processes can utilize an annealing duration of less than about 24 hours.

The annealing process may be carried out to facilitate the formation of a filler material having suitable mechanical characteristics, chemical composition, and/or lattice structure. That is for example, the filler material may have a certain crystalline structure and coefficient of thermal expansion such that the annealing process facilitates rearrangement of the filler material after the forming process, which facilitates reforming of the crystalline structure of the filler material having suitable mechanical characteristics.

It will be appreciated that other materials may be added to the polycrystalline material besides the abrasive material and the filler material. For example, a catalyst material may be added to the polycrystalline material and further may be present in the final-formed polycrystalline material of the abrasive article. Suitable catalyst materials can include a metal or metal alloy material. In particular, the catalyst material may include a transition metal element. In accordance with one embodiment, the catalyst material can include a metal such as cobalt, iron, nickel, molybdenum, and a combination thereof.

Figure 3:
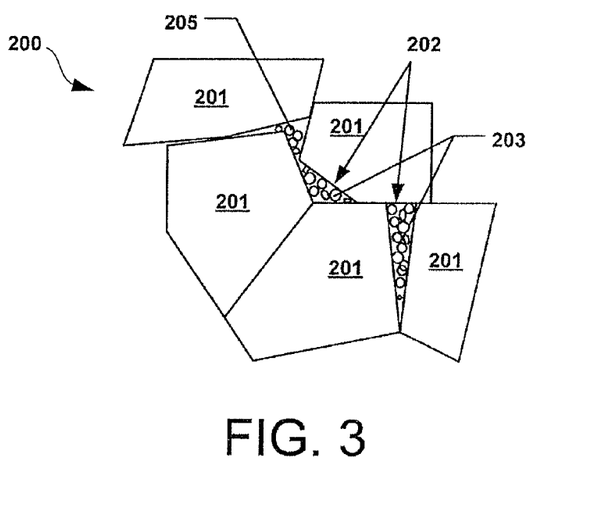
FIG. 3 includes an illustration of the microstructure of an abrasive article in accordance with an embodiment.

FIG. 3 includes an illustration of the microstructure of an abrasive article in accordance with an embodiment. In particular, FIG. 3 includes an illustration of a polycrystalline material 200 having grains 201 comprising an abrasive material as described in embodiments herein. The polycrystalline material 200 can also include grain boundaries 202 extending between and separating the grains 201. As illustrated, in accordance with one embodiment, the abrasive article can be formed such that the polycrystalline material 200 can contain certain materials within the grain boundaries 202, such as a filler material 203, which can be present as a single-crystalline phase, a polycrystalline phase, an amorphous phase material, or combination thereof. Additionally, the grain boundaries 202 can contain a catalyst material 205 that can include those materials described herein. Likewise, the catalyst material 205 can be present as a single-crystalline phase material, a polycrystalline phase material, an amorphous phase material, or combinations thereof.

The abrasive articles according to embodiments herein can be formed such that the grains 201 have an average grain size of not greater than about 100 microns. In other embodiments, the grains 201 have an average grain size of not greater than about 75 microns, such as not greater than about 50 microns, or even not greater than about 40 microns. In particular instances, the grains 201 are formed such that the average grain size is within a range between about 0.1 microns and about 40 microns, and more particularly between about 0.1 microns and about 25 microns. It will be appreciated that the size distribution of the grains can be controlled. For example, certain abrasive articles can be formed to have a single distribution of grains sizes about a mean grain size (i.e., a generally Gaussian-shaped distribution), a bimodal grain size distribution, or any other grain size distribution suitable for the intended application of the article.

In accordance with embodiments herein, the filler material of the final-formed abrasive article can be an inorganic material having suitable mechanical characteristics, such as a negative thermal expansion coefficient as described in more detail herein. Suitable inorganic materials can include metals, ceramics, cermets, and a combination thereof. In particular instances, the filler material can include an oxide. The oxide material can include a metal element such as a transition metal element, such as zirconium (Zr), hafnium (Hf), tungsten (W), molybdenum (Mo), tin (Sn), uranium (U), thorium (Th), phosphorous (P), vanadium (V), scandium (Sc), aluminum (Al), magnesium (Mg), lanthanum (La), chromium (Cr), iron (Fe), and a combination thereof. Notably, such oxides can be stoichiometric metal oxide compounds or non-stoichiometric metal oxide compounds. Certain embodiments can utilize a filler material comprising an isopolyoxometalate.

The filler material can be a polycrystalline material, such that is has a polycrystalline phase. In other embodiments, the filler material has an amorphous phase content. Additionally, with reference to the lattice structure of the filler material, generally the filler material can have a cubic or orthorhombic crystalline structure, or combinations thereof.

In particular instances, the filler material of the final-formed abrasive article includes an oxide material selected from the group of oxides consisting of $AMO_3$, $AM_2O_8$, $AM_2O_7$, $A_2M_3O_{12}$, and a combination thereof. In such compositions, the variable "A" represents a metal element, the variable "M" represents a metal element that is different from the metal element represented by "A", and the variable "O" represents oxygen. According to embodiments herein, the variable "A" generally represents a metal element from the group of zirconium (Zr), hafnium (Hf), tin (Sn), uranium (U), thorium (Th), scandium (Sc), aluminum (Al), iron (Fe), chromium (Cr), lanthanum (La), and a combination thereof. In certain instances, the metal element represented by the variable "M" can include a metal element such as of tungsten (W), molybdenum (Mo), phosphorous (P), vanadium (V), and a combination thereof.

In more particular embodiments, the filler material can include a tungstate, molybdate, vanadate, and a combination thereof. For example, the polycrystalline material comprises a filler material that is made of zirconium tungstate. Certain polycrystalline materials may be formed such that the filler materials consist essentially, or even entirely of, zirconium tungstate. Some specific exemplary filler materials can include $Sc_2(WO_4)_3$, $Zr_2(WO_4)(PO_4)_2$, $ZrV_2O_7$, $ZrW_2O_8$, $Sc_2W_3O_{12}$, $ZrW_{2-x}Mo_xO_8$, $ZrMo_2O_8$, $HfW_2O_8$, $ZrV_{2-x}P_xO_7$, $Zr_{1-x}Hf_xW_2O_8$, $ZrW_{2-x}Mo_xO_8$, and $Zr_{1-x}M_xW_2O_{8-y}$, wherein M represents Sc, In, and Y. Other exemplary filler materials can include $MgHf(WO_4)_3$, $MgZr(WO_4)_3$, $Al_2W_3O_{12}$.

According to an alternative embodiments, certain filler materials facilitating negative CTE characteristics within the final formed material can include metals such as iron alloys, manganese alloys, chromium alloys, and a combination thereof. In particular instances, such metal materials may be magnetic materials. For example, suitable metal filler materials can include $Lu_2Fe_{17}$, $Y_2Fe_{17}$, $Y_2Al_3Fe_{14-x}Mn_x$, $Tb_2Fe_{16}Cr$, $MnF_3$, $Tb_2Fe_{16.5}Cr_{0.5}$, $Dy_2AlFe_{10}Mn_6$, $Dy_2AlFe_{13}Mn_3$, $Y_2Fe_{16}Al$; magnets $M[N(NC)_2]_2$ (M=Co, Ni), Cr—Mn alloys (e.g., base-centered cubic crystalline structures) $Zn(CN)_2$.

Generally, the polycrystalline material 200 can be formed such that it contains not greater than about 50 vol % of a filler material. In other instances, the amount of filler material in the final-formed abrasive article can be less, such as not greater than about 40 vol %, not greater than about 30 vol %, not greater than about 20 vol %, not greater than about 15 vol %, not greater than about 10 vol %, or even not greater than about 5 vol %. In particular instances, the polycrystalline material can contain between about 1 vol % and 50 vol %, such as between 1 vol % and 40 vol %, between 1 vol % and about 30 vol %, between about 1 vol % and about 20 vol %, or even between 1 vol % and 10 vol % of the filler material.

Embodiments herein may utilize a filler material within the final-formed abrasive article that have an average coefficient of thermal expansion that is not greater than zero within a range of temperatures between about 70 K to about 1500 K. That is, the average coefficient of thermal expansion over a temperature range, such as between any two temperatures within the range of temperatures between 70 K and 1500 K, is negative. Preferably, the average coefficient of thermal expansion is a negative value over the entire span of the range from 70 K to 1500 K, but this may not necessarily be the case for certain materials. In particular instances, the filler material can have an average coefficient of thermal expansion that is less than zero, that is, a negative average coefficient of thermal expansion within a range of temperatures between about 70 K to about 1500 K. For example, some filler materials can have an average negative coefficient of thermal expansion of not greater than about $-0.1 \times 10^{-6}$/K, such as not greater than about $-1.0 \times 10^{-6}$/K, not greater than about $-2.0 \times 10^{-6}$/K, or even not greater than about $-5.0 \times 10^{-6}$/K over the range of temperatures between about 70 K to about 1500 K. Particular abrasive articles can incorporate a filler material having an average negative coefficient of thermal expansion within a range between about $-0.1 \times 10^{-6}$/K and about $-20 \times 10^{-6}$/K, such as between about $-1.0 \times 10^{-6}$/K and about $-18 \times 10^{-6}$/K, and even between about $-2.0 \times 10^{-6}$/K and about $-15 \times 10^{-6}$/K over the range of temperatures between about 70 K to about 1500 K.

In particular instances, the filler material comprises a material having an isotropic negative coefficient of thermal expansion. The isotropic nature of the thermal expansion characteristic facilitates equal and uniform volume decrease, as opposed to an anisotropic volumetric change.

As described in accordance with embodiments herein, the polycrystalline material of the final-formed abrasive article can be formed such that it includes a passivation agent. Such a passivation agent may be present within the particles of the filler material, and may be bonded directly to the filler material. In some materials, the passivation agent may be present within the grain boundary 202. In still other instances, the passivation agent may be present with the catalyst material 205, and may even more particularly, be bonded directly to the catalyst material 205. In still other instances, the passivation agent may be present within the crystalline grains 201 of the polycrystalline material 200. The passivation agent can include those materials described previously herein. It will also be appreciated that the passivation agent can be dispersed throughout the polycrystalline material 200 in various phases, including the grains 201, the grain boundaries 202, or a combination thereof.

The passivation agent can have a particular average coefficient of thermal expansion (CTE) of not greater than about $20 \times 10^{-6}$/K over the range of temperatures between about 70 K to about 1500 K. Other embodiments may utilize a passivation agent having an average CTE of not greater than about $15 \times 10^{-6}$/K, such as not greater than about $10 \times 10^{-6}$/K, not greater than about $8 \times 10^{-6}$/K over the range of temperatures between about 70 K to about 1500 K. Certain embodiments may utilize an average CTE for the passivation agent within a range between about $0.1 \times 10^{-6}$/K and about $20 \times 10^{-6}$/K, such as between about $1 \times 10^{-6}$/K and about $15 \times 10^{-6}$/K over the range of temperatures between about 70 K to about 1500 K.

Generally, the polycrystalline material is formed such that it comprises a minor amount of the passivation agent. For example, suitable amounts of the passivation agent can include not greater than about 10 vol %. In other embodiments, this content may be less, such as not greater than about 8 vol %, such as not greater than about 5 vol %, and particularly within a range between about 1 vol % and 10 vol %, and even more particularly between about 1 vol % and about 5 vol %.

As described herein, the polycrystalline material 200 can include a certain content of catalyst material 205. The catalyst material 205 may be present in an amount of not greater than about 20 vol %. In other instances, the polycrystalline material can include an amount of catalyst material that is not greater than about 15 vol %, such as not greater than about 12 vol %, not greater than about 10 vol %, or even not greater than about 8 vol %. Particular embodiments can utilize an amount of catalyst material within a range between about 1 vol % and 20 vol %, such as between about 1 vol % and about 15 vol %. It will be appreciated that various methods exist to provide the catalyst material within the polycrystalline material. For example, the catalyst material may be present within the initial preformed material of the polycrystalline material. Alternatively, the catalyst material may be present within a material layer adjacent the polycrystalline material during forming, and the catalyst material moves from the adjacent material layer into the polycrystalline layer during formation.

The catalyst material 205 can include those materials previously described herein. Moreover, the catalyst material 205 as illustrated in FIG. 2, may be present within the grain boundaries 202. Additionally, the catalyst material may be present at an external surface of the polycrystalline material, and more particularly at an external surface of the abrasive article. That is, for example, the abrasive article may be formed such that it may not necessarily undergo additional processes to remove a portion of the catalyst material. Still, it may be suitable to undergo a removal process to leach a certain amount of the catalyst material from the polycrystalline material.

The catalyst material can have a particular average coefficient of thermal expansion (CTE) of not greater than about $15 \times 10^{-6}$/K over the range of temperatures between about 70 K to about 1500 K. Other embodiments may utilize a catalyst material having an average CTE of not greater than about $10 \times 10^{-6}$/K, such as not greater than about $8 \times 10^{-6}$/K, not greater than about $5 \times 10^{-6}$/K over the range of temperatures between about 70 K to about 1500 K. Certain embodiments may utilize an average CTE for the catalyst material within a range between about $0.1 \times 10^{-6}$/K and about $15 \times 10^{-6}$/K, such as between about $1 \times 10^{-6}$/K and about $10 \times 10^{-6}$/K, or more particularly between about $1 \times 10^{-6}$/K and about $8 \times 10^{-6}$/K, over the range of temperatures between about 70 K to about 1500 K.

Figure 4:
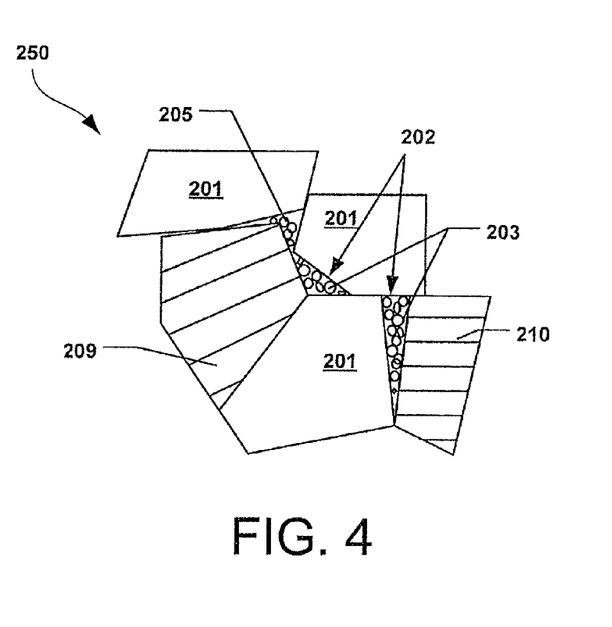
FIG. 4 includes an illustration of the microstructure of an abrasive article in accordance with an embodiment.

FIG. 4 includes an illustration of microstructure of an abrasive article in accordance with an embodiment. Unlike the polycrystalline material 200 of FIG. 3, the polycrystalline material 250 of FIG. 4 illustrates grains 201, 209 and 210, which can include different materials. For example, the grains 201 can include the abrasive material, while the grains 209 and 210 can include the filler material. Accordingly, embodiments herein may utilize a polycrystalline material, wherein a portion of the grains comprise an abrasive material, and a portion of the grains comprise one or more filler materials. Notably, in some instances, a portion of the grains 209 and 210 consist essentially of the filler material. The filler material 203 can have an average crystalline size, represented by the grains 209 and 210 that is approximately the same size of the grains 201 made of the abrasive material, and significantly greater in size as compared to the catalyst 205 material contained within the grain boundaries 202.

As additionally shown in FIG. 4, the polycrystalline material 250 can be formed such that the catalyst material 205 is contained within the grain boundaries 202. The grains 201 comprising the abrasive material, grains 209 and 210 comprising the filler material, and catalyst material 205 of the polycrystalline material 250 can be the same as those described in accordance with other embodiments. It will be appreciated that depending upon the intended application, polycrystalline materials having the microstructure of FIG. 4, can have various amounts of grains comprising the abrasive material as compared to the amount of grains having the filler material. Moreover, the grains 209 and 210 can contain the same type of filler material or a different type of filler material. That is, certain embodiments may utilize a polycrystalline material having a first type of filler grain (e.g., grain 209) and a second type of filler grain (e.g., grain 210).

Figure 5:
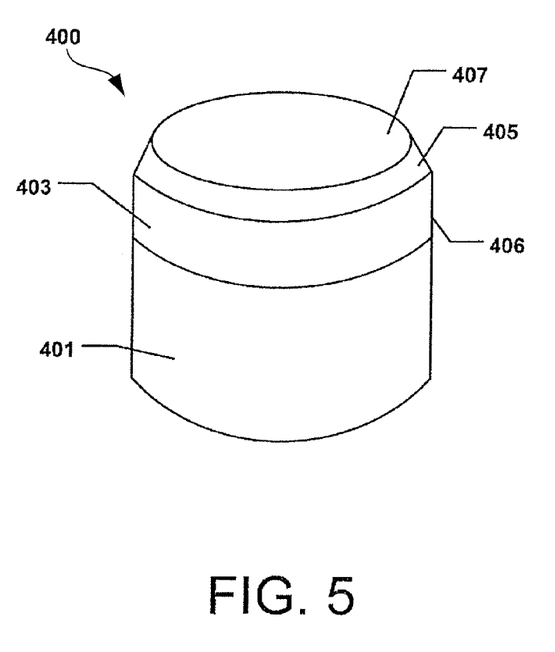
FIG. 5 includes a perspective view illustration of a cutting element incorporating an abrasive article in accordance with an embodiment.

FIG. 5 includes a perspective view image of a cutting element for use in a drill bit in accordance with an embodiment. The cutting element 400 can include a substrate 401 having an upper surface and an abrasive layer 403 overlying the upper surface. As illustrated, the abrasive layer 403 can include a chamfer surface 405 angled with respect to a side surface 406 and upper surface 407 of the abrasive layer 403. The abrasive layer 403 can include a polycrystalline material as described in accordance with embodiments herein. Notably, the cutting element 400 can be formed such that the abrasive layer 403 includes a filler material as described in accordance with embodiments herein.

Additionally, the substrate 401 can be formed such that it includes a substrate filler material. The substrate filler material can be a material having an average coefficient of thermal expansion of not greater than zero within a range of temperatures between 70 K and about 1500 K. In other embodiments, the substrate 401 includes a substrate filler material having a negative average coefficient of thermal expansion within a range of temperatures between 70 K and about 1500 K.

The substrate 401 can have a substrate filler material that is different than the abrasive filler material of the abrasive layer 403. Such materials can be compositionally different from each other, that is, different in their chemical compositions. In other embodiments, the substrate filler material and the abrasive filler material can have different average coefficients of thermal expansion within a range of temperatures of 70 K and about 1500 K.

In some instances, the cutting element 400 can be formed such that the substrate 401 has a greater content, as measured in weight percent, of the substrate filler material than the content of abrasive filler material present within the abrasive layer 403. Provision of such a cutting element 400 may facilitate reduction in mechanical strain, particularly through thermal generated stresses due to a CTE mismatch between the abrasive layer 403 and substrate 401.

Articles according to embodiments herein can include abrasive materials that can have particularly low average coefficients of thermal expansion. For example, materials here can have an average coefficient of thermal expansion (CTE) of not greater than about $15 \times 10^{-6}$/K within a range of temperatures between about 70 K to about 1500 K. In fact, some of the polycrystalline abrasive materials can have a lower CTE, such as not greater than about $12 \times 10^{-6}$/K, not greater than about $10 \times 10^{-6}$/K, not greater than about $8.0 \times 10^{-6}$/K, not greater than about $6.0 \times 10^{-6}$/K, not greater than about $5.0 \times 10^{-6}$/K, and even not greater than about $4.0 \times 10^{-6}$/K. Particular embodiments may utilize an abrasive material having an average coefficient of thermal expansion within a range between about $0.1 \times 10^{-6}$/K and about $15 \times 10^{-6}$/K, such as between about $0.1 \times 10^{-6}$/K and about $12 \times 10^{-6}$/K, between about $0.1 \times 10^{-6}$/K and about $10 \times 10^{-6}$/K, between about $0.1 \times 10^{-6}$/K and about $8.0 \times 10^{-6}$/K, between about $0.1 \times 10^{-6}$/K and about $6.0 \times 10^{-6}$/K, between about $0.1 \times 10^{-6}$/K and about $5.0 \times 10^{-6}$/K, and even between about $0.1 \times 10^{-6}$/K and about $4.0 \times 10^{-6}$/K.

Certain articles herein can incorporate superabrasive materials, such as diamond (e.g., polycrystalline diamond) and/or cubic boron nitride. In particular reference to the articles incorporating such materials, the average coefficient of thermal expansion can be particularly low. For example, the article incorporating an abrasive can have an average coefficient of thermal expansion (CTE) of not greater than about $4.5 \times 10^{-6}$/K within a range of temperatures between about 70 K to about 1500 K. In fact, some of the polycrystalline abrasive materials can have a lower CTE, such as not greater than about $4.2 \times 10^{-6}$/K, not greater than about $4.0 \times 10^{-6}$/K, not greater than about $3.8 \times 10^{-6}$/K, not greater than about $3.5 \times 10^{-6}$/K, not greater than about $3.3 \times 10^{-6}$/K, not greater than about $3.0 \times 10^{-6}$/K, not greater than about $2.8 \times 10^{-6}$/K, not greater than about $2.5 \times 10^{-6}$/K, not greater than about $2.2 \times 10^{-6}$/K, not greater than about $2.0 \times 10^{-6}$/K, not greater than about $1.9 \times 10^{-6}$/K, not greater than about $1.8 \times 10^{-6}$/K, or even not greater than about $1.6 \times 10^{-6}$/K within a range of temperatures between about 70 K to about 1500 K. Particular embodiments may utilize an abrasive material having an average coefficient of thermal expansion within a range between about $1.0 \times 10^{-6}$/K and about $4.2 \times 10^{-6}$/K, such as between about $1.1 \times 10^{-6}$/K and about $4.0 \times 10^{-6}$/K, between between about $1.0 \times 10^{-6}$/K and about $4.0 \times 10^{-6}$/K, between about $1.0 \times 10^{-6}$/K and about $3.5 \times 10^{-6}$/K, between about $1.0 \times 10^{-6}$/K and about $3.0 \times 10^{-6}$/K, between about $1.0 \times 10^{-6}$/K and about $2.8 \times 10^{-6}$/K, between about $1.0 \times 10^{-6}$/K and about $2.5 \times 10^{-6}$/K, and more particularly between about $1.2 \times 10^{-6}$/K and about $2.0 \times 10^{-6}$/K within a range of temperatures between about 70 K to about 1500 K.

The abrasive layer 403 can be formed such that it has an average thickness of at least about 0.5 mm. For example, the abrasive layer 403 can be formed such that it has an average thickness of at least about 0.75 mm, such as at least about 1 mm, at least about 1.3 mm, at least about 2 mm, or even at least about 3 mm. In particular instances, the abrasive layer 403 is formed such that it has a thickness within a range between 0.5 mm and about 5 mm, between about 0.75 mm and about 4 mm, and more particularly between about 0.75 mm and about 3 mm.

In certain embodiments, the interface between the substrate 401 and the abrasive layer 403 can be modified in light of modifications to the residual stresses between the abrasive layer 403 and substrate 401 based on incorporation of the substrate filler material and abrasive filler material. For example, some embodiments may opt for a substantially planar interface contour between the substrate 401 and the abrasive layer 403. In other embodiments, the interface can have an non-planar contour.

The abrasive layer 403 can be formed such that it includes multiple layers or films of material. The individual layers within the abrasive layer 403 can be stacked on top of each other, such that a first layer is adjacent to the substrate 401, a second layer is spaced from the substrate 401 and overlying the first layer. Any number of layers can be used. The layers can be formed such that each of the layers can be made of a different abrasive material. Notably, the abrasive material can differ based on grade, grain size, and/or grain shape. For example, the first layer of abrasive material can contain a larger average grain size than a second, overlying layer of abrasive material.

Moreover, in embodiments utilizing an abrasive layer 403 having multiple layers of material, each of the discrete layers can contain a different type of filler material. Additionally, each of the layers can contain a different amount of filler material. For example, the first layer of abrasive material, can include a greater content of an abrasive filler material than a second layer of abrasive material overlying the first layer. It will be appreciated that various combinations of amounts of filler material combined with the number of layers of abrasive material can be utilized.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

In the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description, with each claim standing on its own as defining separately claimed subject matter.

What is claimed is:

1. An abrasive article, comprising:
a material including an abrasive material and a filler material, the filler material comprising at least one of a tungstate, a molybdate, and a vanadate, and wherein the filler material has an average negative coefficient of thermal expansion (CTE) within a range of temperatures between about 70 K to about 1500 K.

2. The abrasive article of claim 1, wherein the abrasive material comprises a Vickers hardness of at least about 25 GPa.

3. The abrasive article of claim 1, wherein the abrasive material comprises a material selected from the group of materials consisting of diamond, diamond-like carbon, nitrides, carbides, borides, silicates, and a combination thereof.

4. The abrasive article of claim 3, wherein the nitrides include aluminum nitride.

5. The abrasive article of claim 1, wherein the material comprises a polycrystalline material including grains separated by grain boundaries.

6. The abrasive article of claim 5, wherein the grains comprise the abrasive material.

7. The abrasive article of claim 5, wherein the grains comprise the filler material.

8. The abrasive article of claim 5, wherein the grains comprise a matrix of abrasive material and the filler material is contained within the matrix.

9. The abrasive article of claim 5, wherein the filler material is contained within the grain boundaries.

10. The abrasive article of claim 1, wherein the filler material comprises an oxide.

11. An abrasive article, comprising:
a material including an abrasive material and a filler material having an average negative coefficient of thermal expansion (CTE) within a range of temperatures between about 70 K to about 1500 K, wherein the filler material comprises an isopolyoxometalate.

12. An abrasive article, comprising:
an abrasive material comprising polycrystalline diamond, a catalyst material, and a filler material comprising at least one of a tungstate, a molybdate, and a vanadate, wherein the abrasive material comprises an average coefficient of thermal expansion (CTE) of not greater than about $15 \times 10^{-6}$/K within a range of temperatures between about 70 K to about 1500 K.

13. The abrasive article of claim 12, wherein the coefficient of thermal expansion is not greater than about $8 \times 10^{-6}$/K within a range of temperatures between about 70 K to about 1500 K.

14. The abrasive article of claim 12, wherein the coefficient of thermal expansion is within a range between about $1.0 \times 10^{-6}$/K and about $4.5 \times 10^{-6}$/K within a range of temperatures between about 70 K to about 1500 K.

15. The abrasive article of claim 12, wherein the catalyst material is present in an amount of not greater than about 20 vol %.

16. The abrasive article of claim 12, wherein the catalyst material is present at an external surface of the material.

17. An abrasive article, comprising:
a polycrystalline material comprising abrasive grains separated by grain boundaries; and
a filler material disposed at the grain boundaries between the abrasive grains, the filler material selected from the group of oxides consisting of $AMO_3$, $AM_2O_8$, $AM_2O_7$, $A_2M_3O_{12}$, and a combination thereof, wherein A represents a metal element, M represents a metal element different from the metal element represented by A, and O represents oxygen.

18. The abrasive article of claim 17, wherein A represents a metal selected from the group of metal elements consisting of Zr, Hf, Sn, U, Th, Sc, Al, Fe, Cr, and a combination thereof.

19. The abrasive article of claim 17, wherein M represents a metal selected from the group of metal elements consisting of W, Mo, P, V, and a combination thereof.

20. The abrasive article of claim 17, wherein the filler material comprises at least one of a tungstate, a molybdate, and a vanadate.

* * * * *